US007552381B2

United States Patent
Barrus

(10) Patent No.: US 7,552,381 B2
(45) Date of Patent: *Jun. 23, 2009

(54) CHECK BOXES FOR IDENTIFYING AND PROCESSING STORED DOCUMENTS

(75) Inventor: John W. Barrus, Menlo Park, CA (US)

(73) Assignee: Ricoh Co., Ltd., Tokyo (JP)

( * ) Notice: Subject to any disclaimer, the term of this patent is extended or adjusted under 35 U.S.C. 154(b) by 232 days.

This patent is subject to a terminal disclaimer.

(21) Appl. No.: 10/816,049

(22) Filed: Mar. 31, 2004

(65) Prior Publication Data

US 2005/0162686 A1 Jul. 28, 2005

Related U.S. Application Data

(63) Continuation-in-part of application No. 10/665,097, filed on Sep. 16, 2003, which is a continuation-in-part of application No. 10/404,916, filed on Mar. 31, 2003.

(51) Int. Cl.
 *G06F 17/00* (2006.01)
(52) U.S. Cl. .............. 715/201; 715/202; 715/203; 715/204; 715/845; 358/464; 382/114
(58) Field of Classification Search ................ 715/500, 715/201–204; 358/1.15
See application file for complete search history.

(56) References Cited

U.S. PATENT DOCUMENTS

| 4,417,239 | A |   | 11/1983 | Demke et al. |         |
|-----------|---|---|---------|--------------|---------|
| 4,823,303 | A |   | 4/1989  | Terasawa     |         |
| 4,987,447 | A | * | 1/1991  | Ojha         | 399/84  |
| 5,060,135 | A | * | 10/1991 | Levine et al.| 715/769 |
| 5,153,831 | A |   | 10/1992 | Yianitos     |         |
| 5,161,037 | A | * | 11/1992 | Saito        | 358/468 |
| 5,168,371 | A | * | 12/1992 | Takayanagi   | 358/296 |
| 5,225,900 | A | * | 7/1993  | Wright       | 358/501 |
| 5,243,381 | A | * | 9/1993  | Hube         | 399/84  |

(Continued)

FOREIGN PATENT DOCUMENTS

EP    378 848 A2    7/1990

(Continued)

OTHER PUBLICATIONS

A. Grasso, A. Karsenty, M. Susani, "Augmenting Paper to Enhance Community INformation Sharing," DARE 2000, Apr. 2000 (P002331664.

(Continued)

*Primary Examiner*—Doug Hutton
*Assistant Examiner*—Quoc A Tran
(74) *Attorney, Agent, or Firm*—Blakely, Sokoloff, Taylor & Zafman LLP

(57) ABSTRACT

A user selects one or more check boxes on a collection coversheet to identify, by location on the coversheet, target documents within a previously stored collection of documents. The check boxes also specify actions to be performed on the target documents. The coversheet is scanned and the check boxes are located and read to determine which have been marked. The specified actions are then performed on the target documents. If the specified actions change the organization or architecture of the document collection, an updated version of the collection may be generated and stored, and a new coversheet may be printed.

76 Claims, 3 Drawing Sheets

U.S. PATENT DOCUMENTS

| | | | |
|---|---|---|---|
| 5,255,389 A * | 10/1993 | Wang | 707/10 |
| 5,267,303 A * | 11/1993 | Johnson et al. | 379/100.07 |
| 5,280,609 A * | 1/1994 | MacPhail | 707/1 |
| 5,299,123 A * | 3/1994 | Wang et al. | 707/2 |
| 5,309,359 A | 5/1994 | Katz et al. | |
| 5,349,658 A | 9/1994 | O'Rourke et al. | |
| 5,369,508 A * | 11/1994 | Lech et al. | 358/462 |
| 5,384,703 A | 1/1995 | Withgott et al. | |
| 5,404,295 A | 4/1995 | Katz et al. | |
| 5,418,948 A | 5/1995 | Turtle | |
| 5,438,426 A | 8/1995 | Miake et al. | |
| 5,442,795 A | 8/1995 | Levine et al. | |
| 5,448,375 A * | 9/1995 | Cooper et al. | 358/403 |
| 5,459,307 A * | 10/1995 | Klotz, Jr. | 235/454 |
| 5,479,600 A | 12/1995 | Wroblewski et al. | |
| 5,481,666 A | 1/1996 | Nguyen et al. | |
| 5,499,108 A * | 3/1996 | Cotte et al. | 358/400 |
| 5,581,682 A * | 12/1996 | Anderson et al. | 715/530 |
| 5,596,700 A | 1/1997 | Darnell et al. | |
| 5,638,543 A | 6/1997 | Pedersen et al. | |
| 5,680,223 A * | 10/1997 | Cooper et al. | 358/403 |
| 5,680,636 A | 10/1997 | Levine et al. | |
| 5,682,540 A * | 10/1997 | Klotz et al. | 715/209 |
| 5,686,957 A | 11/1997 | Baker | |
| 5,694,559 A | 12/1997 | Hobson et al. | |
| 5,710,874 A * | 1/1998 | Bergen | 358/1.16 |
| 5,715,381 A * | 2/1998 | Hamilton | 358/1.15 |
| 5,717,879 A | 2/1998 | Moran et al. | |
| 5,721,897 A | 2/1998 | Rubinstein et al. | |
| 5,734,752 A * | 3/1998 | Knox | 358/3.28 |
| 5,737,599 A | 4/1998 | Rowe et al. | |
| 5,748,805 A | 5/1998 | Withgott et al. | |
| 5,751,283 A | 5/1998 | Smith | |
| 5,754,308 A * | 5/1998 | Lopresti et al. | 358/403 |
| 5,754,939 A * | 5/1998 | Herz et al. | 455/3.04 |
| 5,760,767 A | 6/1998 | Shore et al. | |
| 5,761,655 A | 6/1998 | Hoffman | |
| 5,761,686 A * | 6/1998 | Bloomberg | 715/529 |
| 5,764,368 A | 6/1998 | Shibaki et al. | |
| 5,765,176 A * | 6/1998 | Bloomberg | 715/514 |
| 5,778,397 A | 7/1998 | Kupiec et al. | |
| 5,781,785 A | 7/1998 | Rowe et al. | |
| 5,784,616 A | 7/1998 | Horvitz | |
| 5,793,365 A | 8/1998 | Tang et al. | |
| 5,802,294 A | 9/1998 | Ludwig et al. | |
| 5,812,664 A * | 9/1998 | Bernobich et al. | 380/278 |
| 5,819,301 A | 10/1998 | Rowe et al. | |
| 5,832,474 A | 11/1998 | Lopresti et al. | |
| 5,838,317 A | 11/1998 | Bolnick et al. | |
| 5,857,185 A | 1/1999 | Yamamura | |
| 5,860,074 A | 1/1999 | Rowe et al. | |
| 5,870,552 A * | 2/1999 | Dozier et al. | 709/219 |
| 5,870,770 A | 2/1999 | Wolfe | |
| 5,873,107 A | 2/1999 | Borovoy et al. | |
| 5,892,536 A | 4/1999 | Logan et al. | |
| 5,933,841 A | 8/1999 | Schumacher et al. | |
| 5,943,679 A | 8/1999 | Niles et al. | |
| 5,946,678 A | 8/1999 | Aalbersberg | |
| 5,950,187 A | 9/1999 | Tsuda | |
| 5,978,477 A | 11/1999 | Hull et al. | |
| 5,982,507 A | 11/1999 | Weiser et al. | |
| 5,986,655 A | 11/1999 | Chiu et al. | |
| 5,986,692 A | 11/1999 | Logan et al. | |
| 5,987,454 A | 11/1999 | Hobbs | |
| 5,990,934 A | 11/1999 | Nalwa | |
| 5,999,173 A | 12/1999 | Ubillos | |
| 6,006,218 A | 12/1999 | Breese et al. | |
| 6,009,442 A * | 12/1999 | Chen et al. | 715/522 |
| 6,021,403 A | 2/2000 | Horvitz et al. | |
| 6,026,409 A | 2/2000 | Blumenthal | |
| 6,028,601 A | 2/2000 | Machiraju et al. | |
| 6,055,542 A | 4/2000 | Nielsen et al. | |
| 6,094,648 A | 7/2000 | Aalbersberg et al. | |
| RE36,801 E | 8/2000 | Logan et al. | |
| 6,101,503 A | 8/2000 | Cooper et al. | |
| 6,182,090 B1 | 1/2001 | Peairs | |
| 6,262,724 B1 | 7/2001 | Crow et al. | |
| 6,301,660 B1 * | 10/2001 | Benson | 713/165 |
| 6,332,147 B1 | 12/2001 | Moran et al. | |
| 6,369,811 B1 | 4/2002 | Graham et al. | |
| 6,409,401 B1 * | 6/2002 | Petteruti et al. | 400/88 |
| 2002/0051201 A1 | 5/2002 | Winter et al. | |
| 2002/0080387 A1 * | 6/2002 | Grasso et al. | 358/1.15 |
| 2002/0097426 A1 | 7/2002 | Gusmano et al. | |
| 2003/0088582 A1 | 5/2003 | Pflug | |
| 2003/0163552 A1 | 8/2003 | Savitzky et al. | |
| 2003/0184598 A1 | 10/2003 | Graham | |
| 2004/0090462 A1 | 5/2004 | Graham | |
| 2006/0126101 A1 * | 6/2006 | Shutt et al. | 358/1.15 |

FOREIGN PATENT DOCUMENTS

| | | |
|---|---|---|
| EP | 0 388 093 | 9/1990 |
| EP | 0388093 A | 9/1990 |
| EP | 459 174 A2 | 12/1991 |
| EP | 0 708 548 | 4/1996 |
| EP | 0708548 A | 4/1996 |
| EP | 737 927 A2 | 10/1996 |
| EP | 762 297 A2 | 3/1997 |
| EP | 802 492 A1 | 10/1997 |
| EP | 1 001 605 A3 | 5/2000 |
| GB | 2 137 788 A | 10/1984 |
| GB | 2 156 118 A | 10/1985 |
| GB | 2 234 609 A | 2/1991 |
| GB | 2 290 898 A | 1/1996 |
| JP | 8-297677 A | 11/1996 |
| WO | WO 99/18523 | 4/1999 |

OTHER PUBLICATIONS

Abdel-Mottaleb, M. et al., "Face Detection in Complex Environments From Color Images," IEEE ICIP 622-626, 1999.

Acrobat Reader Version 2.0 (software application), Adobe Systems Incorporated, screenshots Figures 1-10 (1994).

Adobe Acrobat Reader 3.0 screen dumps (fig. 1-3), 1996.

Adobe Premiere (video editing software) from http://www.adobe.com (2002).

Adobe Systems, Inc., "Adobe Photoshop 4.0 User Guide for Macintosh and Windows," 1996, Title Page, Copyright Page; Chap. 2, pp. 30-31.

Apple Macintosh system 7 reference manual, pp. 30-31 (1991).

Arons, B. "SpeechSkimmer: A System for Interactively Skimming Recorded Speech," ACM Transactions on Computer-Human Interaction 4(1):3-38.

Ball, Thomas et al., "Software Visualization in the Large," IEEE Computer, vol. 29, No. 4, Apr. 1996, pp. 33-43, http://www.computer.org/computer/co1996/r4033abs.htm.

Begole et al., "Flexible Collaboration Transparency," doc. ID: ncstri.vatech_cs/TR-98-11, Virginia Polytechnic Institute and State University, 1998.

Begole et al. "Flexible Collaboration Transparency: Supporting Worker Independence In Replicated Application-Sharing Systems," ACM Transactions On Computer-Human Interaction, Jun. 1999, pp. 95-132, vol. 6, No. 2.

Begole et al., "Supporting Worker Independence in Collaboration Transparency," ACM 0-58113-034-1/98/11, Virginia Polytechnic Institute and State University, pp. 133-142, 1998.

Begole et al., "Supporting Worker Independence In Collaboration Transparency," technical report from the Computer Science Department of Virginia Tech, doc. ID: ncstrl.vatech_cs/TR-98-12.

Bobick et al., "A State Based Approach to the Representation and Recognition of Gesture," IEEE Trans. On Pattern Analysis and Machine Intelligence, pp. 1325-1337, 1997.

Boguraev et al., "Salience-Based Content Characterization Of Text Documents," ACL/EACL '97 Intelligent Scalable Text Summarization Workshop Program, Jul. 11, 1997, 14 pages.

Boguraev et al., "Salience/based Content Characterization of Text Documents," in Proceedings of Workshop on Intelligent Scalable Text Summarization at the ACL/EACL Conference, Madrid, Spain, 12 pages, Jul. 7-12, 1997.

Boreczky, J. et al., "An interactive Comic Book Presentation for Exploring Video," Conference on Human Factors in Computing Systems (CHI 2000), ACM Press, pp. 185-192, 2000.

Boykin et al., "Improving Broadcast News Segmentation Processing," IEEE Multimedia '99, 1999.

Boykin et al., "Machine Learning of Event Segmentation for News on Demand," Communications of the ACM, 43:35-41, 2000.

Brandow et al., "Automatic Condensation of Electronic Publications by Sentence Selection," Information Processing and Management, 31(5):875-685, 1995.

Brown et al., "Automatic Content-Based Retrieval of Broadcast News," ACM Multimedia 5, San Francisco, CA, 1995.

Byrd, D., "A Scrollbar-based visualization for Document Navigation," doc. ID:xxx.cs.IR/9902028, Computing Research Repository: Information Retrieval, 1999.

"c:\...\9149920c.wpd—unmodified" Screen Shots of document created in Corel WordPerfect, 4 pages (Apr. 30, 2002).

Chen et al., "Emotion Recognition from Audiovisual Information," Proc. IEEE Workshop on Multimedia Signal Processing, Los Angeles, CA, USA, pp. 83-88, 1998.

Chen et al., "VIBE: A Video Indexing and Browsing Environment," Proceedings of the SPIE Conference on Multimedia Storage and Archiving Systems, Sep. 20-22, 1999, Boston 3846:148-164, 1999.

Chiu et al., "NoteLook: Taking Notes in Meetings with Digital Video and Ink," ACM Multimedia 99 Orlando, 1999.

Chiu et al., "Automatically Linking Multimedia Meeting Documents by Image Matching," Proceedings of Hypertext '00, ACM, New York, pp. 244-245, 2000.

Christel et al., "Evolving Video Skims into Useful Multimedia Abstractions," Proceedings of the CHI '98 Conference on Human Factors in Computing Systems, pp. 171-178 Los Angeles, CA, Apr. 1998.

Christel et al., "Information Visualization Within a Digital Video Library," Journal of Intelligent Information Systems, 11:35-257, 1998.

Dellaert et al., "Recognizing Emotion in Speech," Proceedings ICSLP 96, Fourth International Conference on Spoken Language Processing New York, IEEE vol. 1970-1973, Cat. No. 96TH8206), 1996.

Dimitrova et al., "Video Keyframe Extraction and Filtering: A Keyframe is not a Keyframe to Everyone," CIKM 1997:113-120, 1997.

Divakaran, A. et al., "Video Browsing System Based on Compressed Domain Feature Extraction," IEEE Transactions on Consumer Electronics 46:637-644.

Doermann et al., "Applying Algebraic and Differential Invariants for Logo Recognition," Machine Vision and Applications 9:73-86, 1996.

Donato et al., "Classifying Facial Actions," IEEE Trans. on Pattern Analysis and Machine Intelligence, 21:974-989, 1999.

Dorai, C. et al., "Perceived Visual Motion Descriptors from MPEG-2 for content-based HDTV annotation and retrieval," IEEE $3^{rd}$ Workshop on Multimedia Signal Processing, 147-152.

Drucker et al., "SmartSkip: Consumer Level Browsing and Skipping of Digital Video Content," Paper: Technology to Help People Find Information, vol. No. 4, Issue No. 1, pp. 219-226, Minneapolis, Minnesota, USA, Apr. 20-25, 2002.

Erol, B. et al., "Local Motion Descriptors," IEEE Workshop on Multimedia Signal Processing, 467-472, 2001.

Essa et al., "Coding Analysis Interpretation and Recognition of Facial Expressions," IEEE Trans. on Pattern Analysis and Machine Intelligence, 19:757-763, 1997.

"FaceIt Face Recognition Technology Frequently Asked Technical Questions," Visionics Corporation, 36 pages.

"Flexible JAMM Screenshots," downloaded from internet site http://simon.cs.ct.edu/-jamm May 4, 2000.

Foote, J. et al., "An Intelligent Media Browser Using Automatic Multimodal Analysis," ACM Multimedia '98, ACM Press, pp. 375-380, Bristol, UK, 1998.

Foote, J. et al., "Finding Presentations in Recorded Meeting Using Audio and Video Features." ICASPP, 3029-3032, 1999.

Foote, J. et al., "FlyCam: Practical Panoramic Video and Automatic Camera Control," Proceedings of International Conference on Multimedia & Expo, 3:1419-1422, 2000.

Furui et al., "Japanese Broadcast News Transaction and Information Extraction," Communications of the ACM, 43(2):71-73, Feb. 2000.

Gauvain et al., "Transcribing Broadcast News for Audio and Video Indexing," Communications of the ACM, 43:64-70, 2000.

Gibbon, David C., "Generating Hypermedia Documents from Transcriptions of Television Programs Using Parallel Text Alignment," Handbook of Internet and Multimedia Systems and Applications, CRC Press, 1998.

Glance, Natalie et al., "Knowledge Pump: Community-Centered Collaborative Filtering," Xerox Research Centre Europe, Grenoble Laboratory, Oct. 27, 1997, pp. 1-5.

Gliedman, J., "Virtual Office Managers," Computer Shopper, 18(9):290, 1998.

Gordon, "Using Annotated Video as in Information Retrieval Interface," ACM Proceedings of the $5^{th}$ International Conference on Intelligent User Interfaces, New Orleans, pp. 133-140, 2000.

Grasso, Antonietta et al., "Supporting Informal Communication Across Local and Distributed Communities," Xerox Research Centre Europe, Grenoble, France, 8 pages.

Greenberg, Saul, "A Fisheye Text Editor For Relaxed-WYSIWIS Groupware," ACM SIGCHI'96 Conference on Human Factors in Computing System, Companion Proceedings, 1996, pp. 212-213.

Greenberg, et al., "Sharing Fisheye Views in Relaxed-WYSIWIS Groupware Applications," Proceedings of Graphics Interface, Toronto, Canada, May 22-24, 1995, Distributed by Morgan-Kaufmann, pp. 28-38, http://www.cpsu.ucalgary.ca/grouplab/papers/1996/96-Fisheye.GI/gi96fisheye.html.

Gross, R. et al., "Face Recognition in a Meeting Room," IEEE International Conference on Automatic Face and Gesture Recognition, 294-299.

Gross, R. et al., "Towards a Multimodal Meeting Record," Proceedings of International Conference on Multimedia and Expo, 1593-1596.

Hauptmann et al., "Story Segmentation and Detection of Commercials in Broadcast News Video," Advances in Digital Libraries Conference, Santa Barbara, CA Apr. 22-23, 1998.

Hauptmann et al., "Text, Speech and Vision for Video Segmentation: the Informedia Project," Proc. AAAI Fall Symp. Computational Models for Integrating Language and Vision, Boston, MA, Nov. 10-12, 1995.

He et al., "Comparing Presentation Summaries: Slides vs. Reading vs. Listening," Conference on Human Factors in Computing Systems (CHI 2000), Apr. 1-6, 2000.

Hearst et al., "TileBars: Visualization of Term Distribution Information in Full Text Information Access," Proceedings of the ACM SIGCHI Conference on Human Factors in Computing Systems (CHI), Denver, CO., pp. 1-8, May 1995, http://www.acm.org/sigchi/chi95/Electronic/documents/papers/mah_bdy.htm.

Hecht, "Embedded Data Glyph Technology for Hardcopy Digital Documents," Proc. SPIE 2171:341-352, 1994.

Hecht, "Printed Embedded Data Graphical User Interfaces," IEEE Computer, Mar. 2001.

Hill et al., "Edit Wear and Read Wear," Computer Graphics and Interactive Media Research Group, pp. 3-9, May 1992.

Hsu, R.L., et al., "Face Detection in Color Images," Proc. International Conference on Image Processing, 1046-1049, 2001.

Hu et al., "Multimedia Description Framework (MDF) for Content Descriptions of Audio/Video Documents," Fourth ACM Conference on Digital Libraries (DL '99), Aug. 11-14, 1999.

IBM Technical Disclosure Bulletin, "Quick Selection of Window Environment Coordinates," 35:57-60, ISS # 4B, 1992.

Ioffe, et al., "Finding People by Sampling," Proc. International Conference on Computer Vision, pp. 1092-1097, 1999.

Jang et al., "Improving Acoustic Models With Captioned Multimedia Speech," IEEE, 1999, pp. 767-771.

Jin et al., "Topic Tracking for Radio, TV Broadcast, and Newswire," Proceedings of the DARPA Broadcast News Workshop, Feb. 28-Mar. 3, 1999, Herndon, VA.

Johnson, S.E., "Who Spoke When?—Automatic Segmentation and Clustering for Determining Speaker Turns," Proc. Of Eurospeech, 679-682, 1999.

Kapralos, B. et al., "Eyes 'n Ears Face Detection," 2001 International Conference on Image Processing, 1:65-69, 2001.

Kimber, D. et al., "Acoustic Segmentation for Audio Browsers," Interface Conference, Sydney, Australia, 10 pages, 1996.

Komlodi et al., "Key Frame Preview Techniques for Video Browsing," Proceedings of the 3rd ACM International Conference on Digital Libraries, Jun. 23-26, 1998, Pittsburgh, pp. 118-125, 1998.

Lam et al., "Automatic Document Classification Based on Probabilistic Reasoning: Model and Performance Analysis," 3:2719-2723, 1997.

Langley, P., "An Analysis of Bayesian Classifiers," Proceedings of 10th National Conference on Artificial Intelligence, pp. 223-228, 1992.

Langley, P., "Induction of Selective Bayesian Classifiers," Proceedings of the 10th National Conference on Uncertainty in Artificial Intelligence, pp. 400-406, 1994.

Lee, D. et al., "Segmenting People in Meeting Videos Using Mixture Background and Object Models," Proc. Of Pacific Rim Conference on Multimedia, Taiwan, Dec. 16-18, 8 pages, 2002.

Ll et al., "Automatic Text Detection and Tracking in Digital Video," IEEE Transactions on Image Processing—Special Issue on Image and Video Processing for Digital Libraries, 9:147-156, 2000.

Li et al., "Text Extraction and Recognition in Digital Video," Proceedings of Third IAPR Workshop on Document Analysis Systems, pp. 119-128, 1998.

Li et al., "Text Extraction, Enhancement and OCR in Digital Video," DAS '98, LNCS 1655, pp. 363-377, Springer-Verlag Berlin Heidelberg 1999.

Li et al., "Vision: A Digital Video Library," Proceedings of the 1st ACM International Conference on Digital Libraries, pp. 19-27, 1996.

Liang et al., "Practical Video Indexing and Retrieval System," SPIE 3240:294-303, 1988.

Lienhart et al., "On the Detection and Recognition of Television Commercials," Proc. IEEE Conf. On Multimedia Computing and Systems, Ottawa, Canada, pp. 509-516, Jun. 1997.

Ma et al., "An Indexing and Browsing System for Home Video," Invited paper, EUSIPCO '2000, 10th European Signal Processing Conference, Sep. 5-8, 2000, Tampere, Finland.

Manber, U., "The Use of Customized Emphasis in Text Visualization," Proceedings of 1997 IEEE Conf. On Information Visualization, pp. 132-138, Aug. 27-29, 1997, London, England.

Maybury, "News on Demand," Communications of the ACM, 43:33-34, 2000.

Maybury et al., "Multimedia Summaries of Broadcast News," International Conference on Intelligent Information Systems, 1997, pp. 442-449.

Maybury, M. et al., "Segmentation, Content Extraction and Visualization of Broadcast News Video Using Multistream Analysis," AAAI Paper, 1997.

Merialdo et al., "Automatic Construction of Personalized TV News Programs," Seventh ACM International Multimedia Conference, Orlando, Nov. 1999.

Merlino et al., "Broadcast News Navigation Using Story Segmentation," Advanced Information Systems Center, The MITRE Corporation, 1997.

Merlino et al., "Broadcast News Processing Techniques," MITRE Technical Report, MTR 99B0000031, Apr. 1999.

Mohan, "Text-Based Search of TV News Stories," Proc. SPIE 2916:2-13, 1996.

Myers, B.A. et al., "Multi-View Intelligent Editor for Digital Video Libraries," First ACM and IEEE Joint Conference on Digital Libraries, pp. 106-115, Jun. 24-28, 2001, Roanoke, VA.

Oh et al., "Efficient and Cost-Effective Techniques for Browsing and Indexing Large Video Databases," SIGMOD Conference 2000: 415-426.

Pfau, T. et al., "Multispeaker Speech Activity Detection for the ICSI Meeting Recorder," Proc. IEEE Automatic Speech Recognition and Understanding Workshop, 4 Pages, 2001.

Pingali, G. et al., "Multimedia Retrieval Through Spatio-Temporal Activity Maps," ACM Multimedia 129-136, 2001.

Rist, T. et al., "Adding Animated Presentation Agents to the Interface," ACM International Conference on Intelligent User Interfaces, pp. 79-86, 1997.

Rowley et al., "Neural Network-Based Face Detection," IEEE Transactions on Pattern Analysis and Machine Intelligence, 20:23-38, 1998.

Rui, Y. et al., "Viewing Meetings Captured by an Omni-Directional Camera," ACM SIGCHI '01, vol. 3, No. 1, pp. 450-457, Seattle, Mar. 31-Apr. 4, 2001.

Schweighofer et al., "The Automatic Generation of Hypertext Links in Legal Documents," Lecture Notes in Computer Science, vol. 1134, Wagner et al., eds., from 7th Int. Conf., DEXA '96, Sep. 1996, Zurich, Switzerland.

Shahraray et al., "Automatic Generation of Pictorial Transcripts of Video Programs," Proceedings of the SPIE—Int. Soc. Opt. Eng. 2417:512-518, 1995.

Shahraray et al., "Pictorial Transcripts: Multimedia Processing Applied to Digital Library Creation," 1997 IEEE First Workshop on Multimedia Signal Processing, pp. 581-586, 1997.

Shahraray et al., "Automated Authoring of Hypermedia Documents of Video Programs," ACM Multimedia 95, San Francisco, CA, Nov. 5-9, 1995.

Smith et al., "Video Skimming and Characterization Through the Combination of Image and Language Understanding," Computer Vision and Pattern Recognition IEEE 1997.

Snowdon, Dave et al., "Diffusing Information in Organizational Settings: Learning from Experience," CHI 2002, vol. No. 4, Issue No. 1, Apr. 20-25, Minneapolis, Minnesota, pp. 331-338.

Sodergard et al., "Integrated Multimedia Publishing—Combining TV and Newspaper Content on Personal Channels," downloaded from http:www8.org/w8-papers/1b-multimedia/integrated/integrated.html on Apr. 4, 2002, pp. 1-22.

Sonmez et al., "Multiple Speaker Tracking and Detection: Handset Normalization and Duration Scoring," Digital Signal Processing 10:133-143, 2000.

Stauffer, C. et al., "Adaptive Background Mixture Models for Real-Time Tracking," Proceedings of Computer Vision and Pattern Recognition, 246-252.

Suda et al., "Logo and Word Matching Using a General Approach to Signal Registration," Fourth International Conference on Document Analysis and Recognition, Ulm, Germany, Aug. 18-20, 1997, 61-65.

Sumita et al., "Document Structure Extraction for Interactive Document Retrieval Systems," Proceedings of SIGDOC 93, pp. 301-310, Oct. 5-8, 1993, Kitchner, Ontario.

Sun, X. et al., "A Motion Activity Descriptor and its Extraction in Compressed Domain," Proc. IEEE Pacific-Rim Conference on Multimedia (PCM '01), 4 Pages, 2001.

Sun, X. et al., "Panoramic Video Capturing and Compressed Domain Virtual Camera Control," ACM Multimedia, pp. 329-338, 2001.

Taghva et al., "An Evaluation Of An Automatic Markup System," SPIE Proceedings, Feb. 6-7, 1995, pp. 317-327, vol. 2422.

Taghva et al., "Evaluation of an Automatic Markup System," Proceedings SPIE vol. 2422, Document Recognition II, p. 317-327, Mar. 1995.

Taxt, T., "Segmentation of Document Images," IEEE, 11(12):1322-1329 (1989).

Tennenhouse et al., "A Software-Oriented Approach to the Design of Media Processing Environments," Proceedings of the IEEE International Conference on Multimedia Computing and Systems, pp. 435-444, 1994.

Tonomura et al., "VideoMAP and VideoSpaceIcon: Tools for Anatomizing Video Content," Proc. INTERCHI '93, ACM, pp. 131-136, 1993.

Tritschler, A. et al., "Improved Speaker Segmentation and Segments Clustering Using the Bayesian Information Criterion," Proc. Of Eurospeech, pp. 679-682, 1999.

Uchihashi et al., "Summarizing Video Using a Shot Importance Measure and a Frame-Packing Algorithm," Proceedings of the International Conference on Acoustics, Speech, and Signal Processing, Phoenix, AZ, 6:3041-3044, 1999.

Uchihashi et al., "Video Manga: Generating Semantically Meaningful Video Summaries," ACM Multimedia 99, Orlando, Florida, Oct. 30-Nov. 5, 1989.

VideoLogger, Automate Video Acquisition And Production, Virage, Inc., [online] [Retrieved on Apr. 26, 2002] Retrieved from the Internet<URL:http://www.virage.com/products/details.cfm?productID=5&categoryID=1>.

"Video Mail Retrieval Using Voice" Cambridge University Engineering Department Computer Laboratory and Olivetti Research Laboratory summary of research found at http://svr-www.eng.cam.ac.uk/research/projects/vmr/ (1997).

Wactlar et al., "Complementary Video and Audio Analysis for Broadcast News Archives," Communications of the ACM, 43:42-47, 2000.

Wactler et al., "Intelligent Access to Digital Video: Informedia Project," Computer 29:46-52, 1996.

Waibel, A. et al., "Advances in Automatic Meeting Record Creation and Access," Proceedings of the International Conference on Acoustics, Speech, and Signal Processing, pp. 597-600, 2001.

Weiss et al., "Composition and Search with a Video Algebra," IEEE Multimedia 2:12-25, 1995.

Wilcox, L. et al., "Annotation and Segmentation for Multimedia Indexing and Retrieval," Proceedings of the Thirty-First annual Hawaii International Conference on System Sciences (Wailea, Hawaii), vol. II, pp. 259-267, Jan. 1998.

Wittenburg et al., Browsing with Dynamic Key Frame Collages in Web-Based Entertainment Video Services, In Proceedings of IEEE International Conference on Multimedia Computing and Systems, Jun. 7-11, 1999, Florence, Italy, 2:913-918, 1999.

Yang, J. et al., "Multimodal People ID for a Multimedia Meeting Browser," Proceedings of ACM Multimedia, pp. 159-168, 1999.

Yang, M.H. et al., "Detecting Faces in Image: A Survey," IEEE Transactions on Pattern Analysis and Machine Intelligence, 24(1):34-58, 2002.

Zhang et al., "Detection of Text Captions in Compressed Domain Video," International Multimedia Conference Proceedings of the 2000 ACM Workshops on Multimedia 2000, Los Angeles, CA, pp. 201-204.

Damiani, E. et al., "A Fine-Grained Access Control System for XML Documents," ACM Transactions on Information and System Security, May 2002, pp. 169-202, vol. 5, No. 2.

European Search Report, EP 05008745, Jun. 6, 2005, 4 pages.

Grasso, A. et al., "Augmenting Recommender Systems By Embedding Interfaces Into Practices," Proceedings of the $33^{rd}$ Hawaii International Conference on System Sciences 2000 IEEE, pp. 1-9.

Hoadley, C., "A Very Short Introduction to UNIX," The Metropolitan State College of Denver/Information Technology Center for Technology Services, Apr. 30, 2002, pp. 1-18.

Khare, R., "Anatomy Of A URL (and Other Internet-Scale Namespaces, Part 1)," IEEE Internet Computing, Sep.-Oct. 1999, pp. 78-81.

Shen, H. et al., "Access Control For Collaborative Environments," CSCW 92 Proceedings, Nov. 1992, pp. 51-58.

Sloman, M., "Policy Driven Management For Distributed Systems," To be published in Journal of Network and Systems Management, Plenum Press, 1994, vol. 2, No. 4.

"Flowport, Effective Document Management," brochure, 2 pages total.

"Flowport, Paper that knows where it's going," specification sheet, 1 page total.

<http://www.zdnet.com.au/printfriendly?AT=2000023555-20270277-4>, "Captured! Three document capture systems tested, Nov. 28, 2002," visited on Apr. 29, 2003, 8 pages total.

Xerox FlowPort Software, Solutions for the Legal Market from Xerox, 2001 Xerox Corporation, 2 pages total.

"FlowPort™ Xerox Image Routing Software FlowPort Overview," 2003, 4 pages total.

European Search Report and Annex for Application No. EP 05007003 mailed Jun. 24, 2005, 4 pages.

Grasso, A., et al., "Augmenting Paper to Enhance Community Information Sharing", Dare 2000, Apr. 2000, XP002331664 Elsinore, Denmark, pp. 51-62.

* cited by examiner

CHECK BOXES FOR IDENTIFYING AND PROCESSING STORED DOCUMENTS

This application is a continuation-in-part of U.S. patent application Ser. No. 10/665,097, entitled "ACTION STICKERS FOR IDENTIFYING AND PROCESSING STORED DOCUMENTS," filed Sep. 16, 2003, which is a continuation-in-part of U.S. patent application Ser. No. 10/404,916 entitled "METHOD AND APPARATUS FOR COMPOSING MULTIMEDIA DOCUMENTS," filed Mar. 31, 2003.

This application is related to the following commonly owned and co-pending U.S. patent applications:

U.S. patent application Ser. No. 10/404,927 entitled "MULTIMEDIA DOCUMENT SHARING METHOD AND APPARATUS," filed Mar. 31, 2003;

U.S. patent application Ser. No. 09/521,252 entitled "METHOD AND SYSTEM FOR INFORMATION MANAGEMENT TO FACILITATE THE EXCHANGE OF IDEAS DURING A COLLABORATIVE EFFORT," filed Mar. 8, 2000;

U.S. patent application Ser. No. 10/001,895 entitled "PAPER-BASED INTERFACE FOR MULTIMEDIA INFORMATION," filed Nov. 19, 2001;

U.S. patent application Ser. No. 10/081,129 entitled "MULTIMEDIA VISUALIZATION & INTEGRATION ENVIRONMENT," filed Feb. 21, 2002;

U.S. patent application Ser. No. 10/085,569 entitled "A DOCUMENT DISTRIBUTION AND STORAGE SYSTEM," file Feb. 26, 2002;

U.S. patent application Ser. No. 10/174,522 entitled "TELEVISION-BASED VISUALIZATION AND NAVIGATION INTERFACE," filed Jun. 17, 2002;

U.S. patent application Ser. No. 10/175,540 entitled "DEVICE FOR GENERATING A MULTIMEDIA PAPER DOCUMENT," filed Jun. 18, 2002;

U.S. patent application Ser. No. 10/307,235 entitled "MULTIMODAL ACCESS OF MEETING RECORDINGS," filed Nov. 29, 2002; and U.S. patent application Ser. No. 10/639,282 entitled "PHYSICAL KEY FOR ACCESSING A SECURELY STORED DIGITAL DOCUMENT," filed Aug. 11, 2003.

BACKGROUND OF THE INVENTION

1. Field of the Invention

This invention relates generally to document management, and more specifically to techniques of identifying documents in a digitally stored collection and specifying actions to execute on the documents.

2. Background of the Invention

Despite the ideal of a paperless environment that the popularization of computers had promised, paper continues to dominate the office landscape. Ironically, the computer itself has been a major contributing source of paper proliferation. The computer simplifies the task of document composition, and thus has enabled even greater numbers of publishers. Oftentimes, many copies of a document must be made so that the document can be shared among colleagues, thus generating even more paper.

Despite advances in technology, practical substitutes for paper remain to be developed. Computer displays, PDAs (personal digital assistants), wireless devices, and the like all have their various advantages, but they lack the simplicity, reliability, portability, relative permanence, universality, and familiarity of paper. In many situations, paper remains the simplest and most effective way to store and distribute information.

The conveniences and advantages that paper offers signal that its complete replacement is not likely to occur soon, if ever. Perhaps then, the role of the computer is not to achieve a paperless society. Instead, the role of the computer may be as a tool to move effortlessly between paper and electronic representations and maintain connections between the paper and the electronic media with which it was created.

Related, commonly owned, above-referenced patent application Ser. Nos. 10/404,916 and 10/404,927 describe techniques for organizing multimedia documents into one or more collections. A collection coversheet, or document index, representative of the collection can be printed on a suitable medium, such as paper. This coversheet can provide access to the collection by using a multi-function peripheral (MFP). In this way, individuals can share the multimedia documents in the collection by distributing copies of the coversheet to recipients.

Most prior methods to interact with digitally stored documents require the user to enter commands by typing or pressing buttons on hardware or selecting options from displayed menus on the MFP or on a computer. These systems require the user to interact with the hardware and/or navigate menu options and other user interface features on a display device. Some existing paper-based systems require specialized coversheets to provide processing instructions. For example, a coversheet may be used at the beginning of the print job to specify the number of copies, the size of the paper, etc. These systems require a supply of these coversheets to be kept on hand, and usually require the user to take the time to customize the sheet by filling in the details of the job.

The FlowPort system of Xerox provides three different types of paper interfaces. A FlowPort Cover Sheet provides instructions to a scanning system, a Document Token stands in place of a single multi-page document, and a Document Catalog having a linear list of file names can be used to select more than one document using a single sheet of paper. The FlowPort Cover Sheet is a list of destinations and categories. The Cover Sheet can be used to indicate how to route the documents that follow. The document might be e-mailed, faxed, printed, or categorized. Each of the destinations on the Cover Sheet has the appropriate fax number, e-mail address, or printer address associated with it in advance. Cover Sheets are placed on the top of documents, Document Tokens, or Document Catalogs before scanning. The Cover Sheet must be created at the computer and not generated at a multi-function peripheral (MFP). The FlowPort Document Token is a document token representing a single multi-page document. A thumbnail of the first page of the document is displayed as well as the document's machine readable index into the local Xerox DocuShare database. The Token page can be used as a stand-in for a document that already exists in the DocuShare database. The FlowPort Document Catalog is a page containing a linear list of names of documents stored in a DocuShare repository. The check box next to the document name allows the user to select some of the documents in the catalog to be routed using a Cover Sheet. Each Document Catalog has a machine readable index to the collection of documents.

Each FlowPort operation requires at least two sheets of paper, including one generated by a desktop computer. That is, with FlowPort, the Cover Sheet is generated at a computer. The user starts by specifying destinations and creating categories and prints out the task-specific Cover Sheet. This Cover Sheet can be placed on top of a Document Token or a Document Catalog. All the documents represented by the token or selected by check mark on the catalog are routed as indicated on the Cover Sheet.

Xerox Research Centre Europe Project KnowledgePump allows researchers to exchange, discuss, and recommend documents in web pages. KnowledgePump permits the addition of comments and the classification of documents using Cover Sheets. Each Cover Sheet includes a thumbnail of the first page of the document, an index to its electronic counterpart, and space for handwritten notes. Check boxes are provided for ranking and classification of the document. For instance, a user can mark the "very interesting" box if the article is found to be useful and interesting. When the Cover Sheet is scanned, if check boxes are marked, the database entry for that document is updated to reflect the selections indicated by the user.

What is needed is a system and method for providing instructions for processing documents without requiring users to interact with a user interface or hardware device. What is further needed is a system and method that avoids the limitations of prior art schemes for providing instructions for processing stored documents.

SUMMARY

A method and apparatus for identifying and processing stored documents. In one embodiment, the method comprises receiving an image of an overview of a collection and a machine readable pointer identifying the collection, identifying at least one action set forth in the image, identifying at least one document, and performing the at least one action on the at least one document.

BRIEF DESCRIPTION OF THE DRAWINGS

The accompanying drawing illustrates several embodiments of the invention and, together with the description, serves to explain the principles of the invention.

DETAILED DESCRIPTION OF THE EMBODIMENTS

Figure 1:
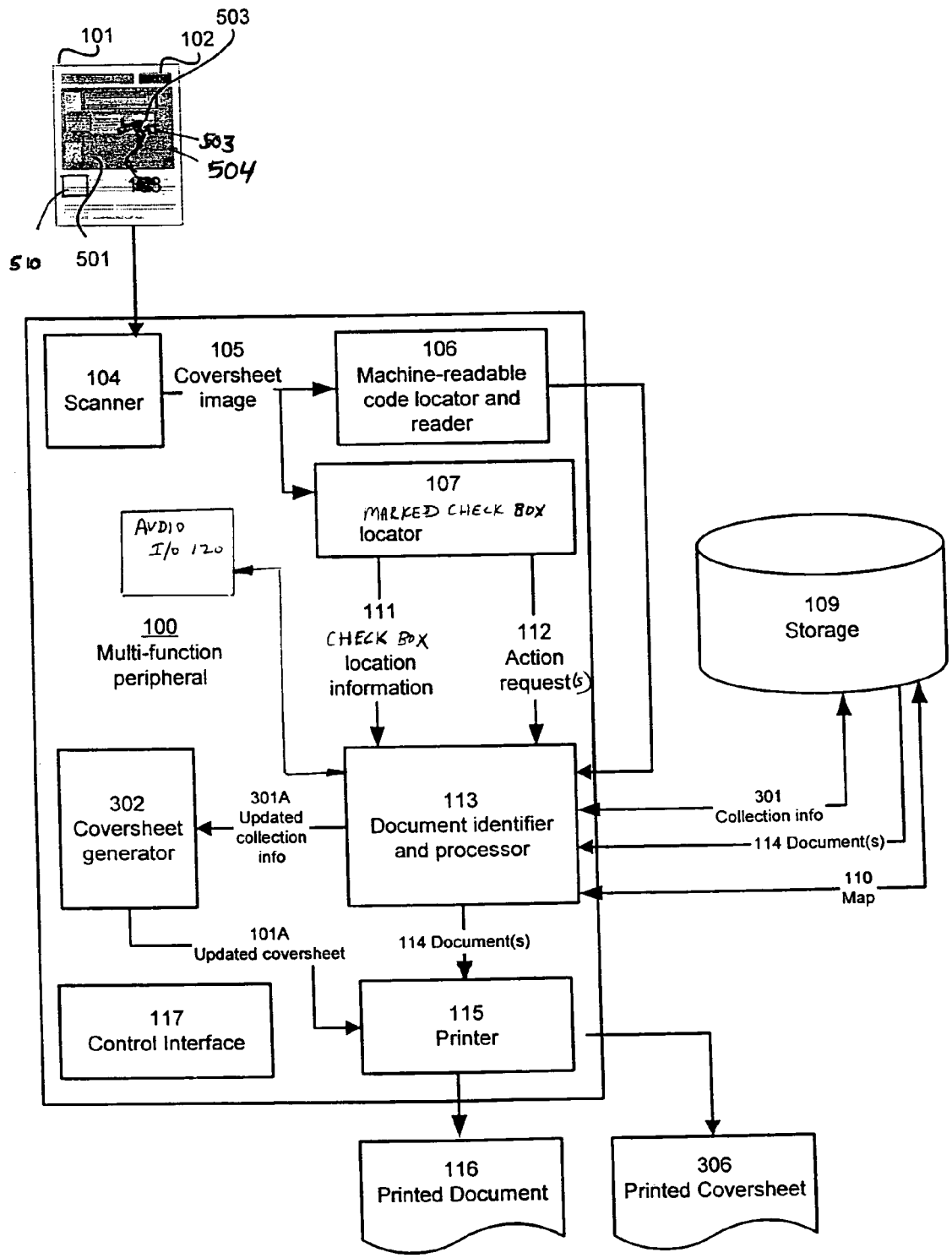
FIG. 1 is a block diagram of one embodiment of an architecture of a system for reading check boxes and performing actions on stored documents in response to marked check boxes.

A method and apparatus for using collection coversheets with check boxes is disclosed. The collection coversheet may use thumbnails to represent documents and optionally may have titles, which are unrelated to their filenames. In one embodiment, a user selects one or more check boxes on a collection coversheet to identify, by location on the coversheet, target documents within a previously stored collection of documents. In one embodiment, each selection can be accessible using un-guessable, unique identifiers anywhere on the Internet. The check boxes also specify actions to be performed on the target documents. The coversheet is scanned and the check boxes are located and read to determine which have been marked. The specified actions are then performed on the target documents. If the specified actions change the organization or architecture of the document collection, an updated version of the collection may be generated and stored, and a new coversheet may be printed. Thus, the actions and document selection may be completed using a single sheet. The collections can contain other collections. That is, the document in a sub-collection can be printed or e-mailed using the coversheet of the containing collection. Thus, the selection of the check box may select a document contained in a sub-collection.

Note that file names are not used on the coversheet. Thus, the entire process can be performed at an MFP. That is, the collection can be created and printed out with check boxes, and then an action can be selected using a check box and put through the MFP.

Check boxes for identifying and processing stored documents are described. In the following description, numerous details are set forth, such as distances between sizes of check boxes, location of check boxes, etc. It will be apparent, however, to one skilled in the art, that the present invention may be practiced without these specific details. In other instances, well-known structures and devices are shown in block diagram form, rather than in detail, in order to avoid obscuring the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and modules presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; etc.

In this application, the following terms are used:

"Document" refers to any collection of information capable of being stored electronically, including but not limited to text, word processing and spreadsheet files, e-mail messages, voice and audio recordings, images, archives of documents, and video recordings.

"Identifier sheet" refers to a piece of paper or other readable media item that identifies a stored document or collection of documents. As described in above-reference related patent applications, the identifier sheet may be a collection coversheet or may take on any other form. In one embodiment, the identifier sheet includes a document identifier and/or collection identifier that may be computer-readable, human-readable, or any combination thereof. Identifier sheets are also referred to herein as "document indexes."

One type of identifier sheet is a "collection coversheet." A collection coversheet identifies a collection and also includes representations of documents within the collection. In one embodiment, a collection coversheet includes:

A collection identifier in machine-readable form (such as a barcode) and/or human-readable form (such as a Uniform Resource Locator (URL) or other text string). The collection identifier provides information describing a location of the collection, such as a directory or folder containing documents in the collection.

A collection overview, which represents documents in the collection by thumbnails. Thumbnails are associated with positions in the overview. For instance, the thumbnail for document A might be in the upper left corner of the collection overview, and the thumbnail for document B might be in the lower right corner.

Further description of collection coversheets, collection identifiers, and collection overviews can be found in related patent applications referenced above and are discussed in more detail below.

For illustrative purposes, the following description sets forth the invention in terms of check boxes and other indication or selection areas on collection coversheets. However, one skilled in the art will recognize that the invention can also be implemented using check boxes on other types of identifier sheets, document indexes, or media items that identify stored documents, and that such implementations would not depart from the essential characteristics of the present invention.

Figure 3:
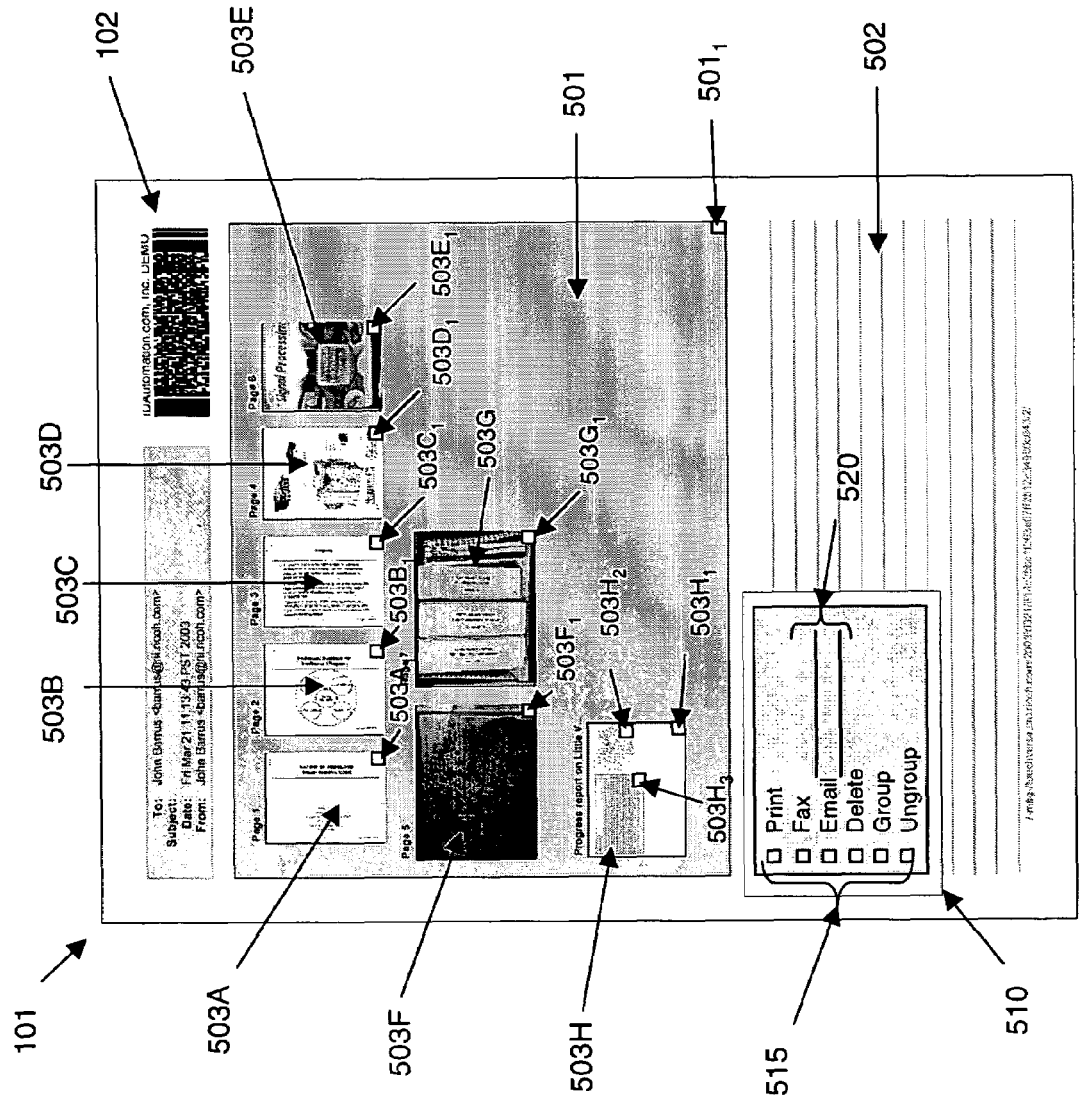
FIG. 3 is an example depicting check boxes on a coversheet of a collection.

Referring now to FIG. 3, there is shown an example of check boxes appearing on a collection coversheet 101. In one embodiment, collection coversheet 101 is a piece of paper that includes machine-readable collection identifier 102 and collection overview area 501 containing thumbnail representations 503A-H of digital documents. Also included is action indication area 510 where actions may be specified and annotation area 502 where notes may be written. The particular layout and components shown in FIG. 3 are merely exemplary.

In the example of FIG. 3, check boxes $501_1$, $503A_1$-$503H_3$, and 515 are located on coversheet 101. Check boxes $503A_1$-$503H_3$ are printed on thumbnail representations 503A-H, respectively, which refers to one of the documents in the collection associated with coversheet 101. Thumbnail representation 503H includes three check boxes $503H_1$-$503H_3$. Thumbnail 503H represents a sub-collection where each of check boxes $503H_1$-$503H_3$ corresponds to one of the documents (or collection of documents) in the sub-collection of 503H.

Check box 501, appears on collection overview area 501, and check boxes 515 appear on action indication area. In general, check boxes $503A_1$-$503H_3$ may be located anywhere in overview area 501 in close proximity to one of the thumbnail representations to ensure a user desiring an action to be performed to a particular document is able to determine the correct check box to mark their selection. Similarly, each of check boxes 515 is located in close proximity to a printed word specifying an action to allow a user to select one or more actions to be performed on selected documents.

The system of the present invention is capable of recognizing selected, or marked, check boxes regardless of the marks made in them. The user may mark the check box by filling in the check box or putting another mark (e.g., a check mark) in the box. In one embodiment, if any of the checkboxes has a dark pixel, it is considered marked. In consideration of the fact that sometimes small bits of dust or noise in the scanning mechanism might form a dark pixel, it is desirable to remove individual dark pixels or small dots from the checkbox image before deciding if it has been marked. Removing noise from images is well understood in the art and is typically done using morphological operations. For a description of morphological operations, see Dougherty, Edward R; Jaakko Astola, "An Introduction to Nonlinear Image Processing" (Vol TT 16) Tutorial texts in optical engineering, O'Shea, Donald ed., SPIE Optical Engineering Press, Bellingham, Wash., 1994.

Check boxes 515 as shown in FIG. 3 are square shaped and are next to, or in close proximity to, a word indicating the desired action (e.g., "Print"). Other formats and shapes (e.g., circles, ovals, etc.) are possible and will be recognized by one skilled in the art in light of this description. For example, another form of indication may be circular or elliptical to provide a user an area to mark to specify an action.

In one embodiment, such an arrangement would signal to the MFP of the present invention that the requested action should be performed on those documents that correspond to thumbnails located between the check boxes.

One of check boxes 515 indicates that the user wishes to perform a grouping action and any of check boxes 503A-H marked would identify particular documents that the user wishes to group together as a sub-collection within the original collection represented by coversheet 101. The MFP interprets the marked check boxes and performs the grouping operation as requested. In one embodiment, grouping and sub-collection organization is implemented as described in related cross-referenced patent applications. The grouping operation consists of creating a new collection, moving the two documents or media into the new collection by adding them to the new collection and deleting them from the old collection. The new collection is then added to the old collection in approximately the same location as the original files.

Collection check box $503H_1$ may be marked to select the collection. This is different than selecting all the documents in the collection. If the collection check box $501H_1$ is checked and the action "print" is selected by the user, the coversheet 101 is printed. If the collection check box $503H_1$ is selected and the operation "delete" is selected, the subcollection will be deleted from the main collection instead of deleting the individual documents contained in the subcollection.

It may be desirable for the user to print out not just a single collection coversheet but also all of the documents contained in that collection. If that collection contains a subcollection, it may also be desirable to print out the documents contained in the subcollection also. In one embodiment, if the user has indicated that an action should be performed on an entire collection and when it is possible to perform that action on other collections contained within that collection, it would be beneficial to give the user the opportunity to perform that action on the entire hierarchy. Of course, if the collection represents the root collection of a deep hierarchy of collections, the user may choose to limit the depth of the action so that it terminates before it reaches all of the documents.

For instance, if the user would like to print a collection, the documents in that collection and all of the documents contained in that collection's subcollections, he could select the print action and choose a depth of 2. At depth 1, all of the documents and coversheets of contained collections are printed. At depth 2, all of the documents inside of the contained collections are also printed.

The maximum depth of an action could be indicated using the control panel of the MFP or "Depth" checkboxes could be provided in the paper user interface on the collection coversheet.

In one embodiment, locating marked check boxes is performed using morphological operations well known to those skilled in the art. More specifically, a program performing morphological operations takes an input image and a "kernel" that resembles the object that is being sought, namely a check box of a given size in this case and compares the kernel with the input image at every pixel. Every time the kernel at a given position in the image exactly matches the input image, it leaves a dark pixel in the output image. In other words, the output image has a dark pixel in every place a check box appears in the input image. Processing logic can search for pixels in the outcome image after comparison and produce a list of image coordinates where there are marked check boxes.

Since a map exists for the collection, processing logic can find the collection overview and will look in the corners of the targets or objects. Similarly, it can keep track of where the boxes are printed and look precisely for the boxes later.

Figure 2:
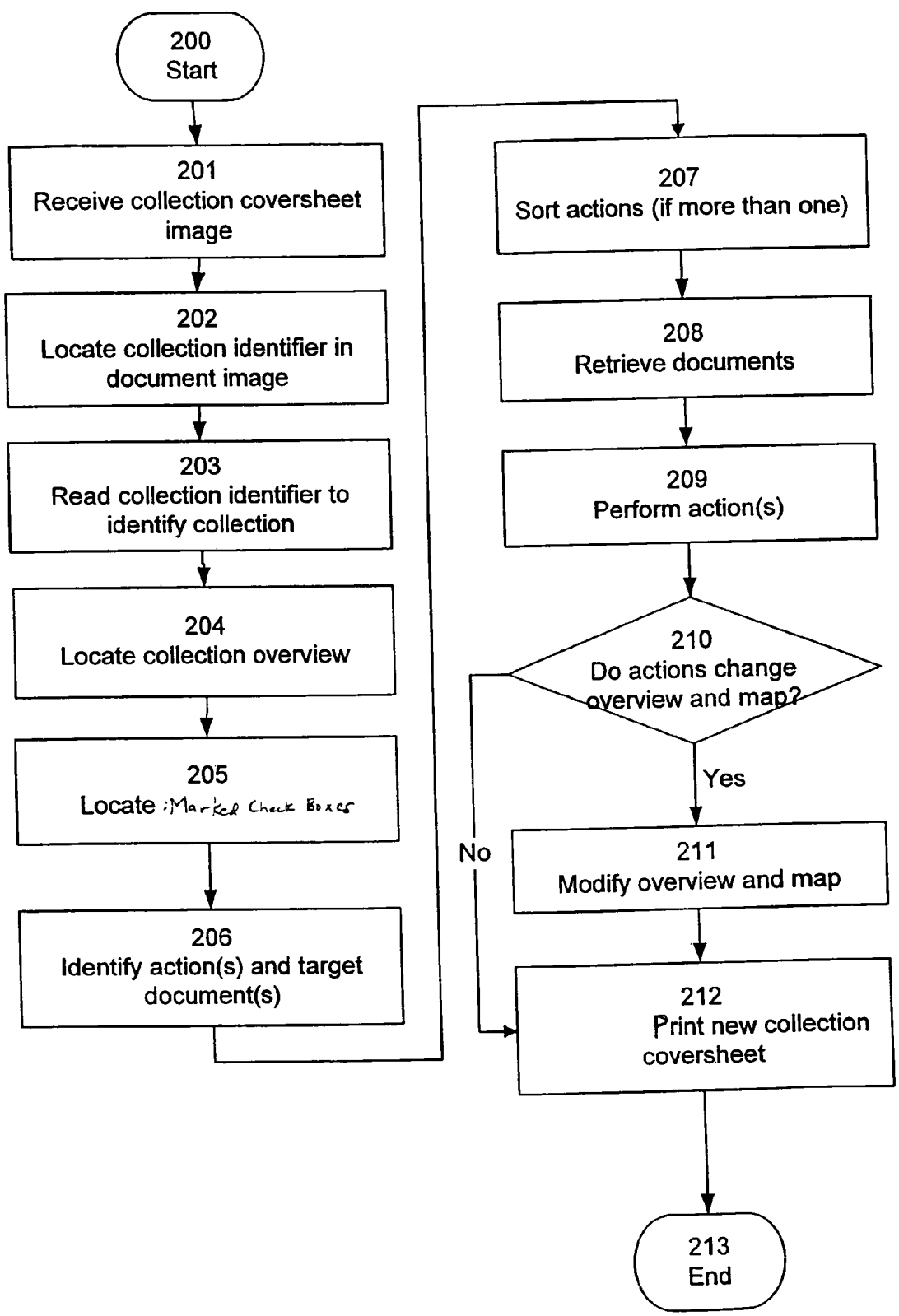
FIG. 2 is a flow diagram of one embodiment of a process for reading check boxes and performing actions on stored documents responsive to check boxes being selected.

Referring now to FIG. 1, there is shown a block diagram depicting one embodiment of a functional architecture of a system for reading marked check boxes and performing actions on stored documents responsive to the marked check boxes. Referring also to FIG. 2, there is shown a flow diagram of one embodiment of a process for reading marked check boxes and performing actions on stored documents responsive to the marked check boxes. The process may be performed, for example, by the system depicted in FIG. 1, or by other functional components and systems. The order of the operations in the described embodiment is merely exemplary. One skilled in the art will recognize that the operations can be performed in an order other than what is depicted.

The use of check boxes is described herein in the context of a multifunction peripheral (MFP) 100 including scanner 104, a machine-readable code locator and reader 106, a marked check box locator 107, a document identifier and processor 113, and printer 115. Marked check box locator 107 may also include functionality for locating collection overview area 501 within collection coversheet 101; alternatively, such functionality may be provided in a separate component (not shown).

MFP 100 may also contain other components, some of which may not be required for the operation of this invention. MFP 100 may contain a network interface card (not shown), which can receive processing requests from the external network, a fax interface, media capture devices, a media capture port, and the like.

Control interface 117 provides a mechanism by which the user can initiate, configure, monitor, and/or terminate MFP 100 operations, for example, to make copies, scan documents, and print faxes. In one embodiment, interface 117 includes a keypad, display, touchscreen, or any combination thereof.

The components shown in MFP 100 are functional components that may be implemented using any combination of hardware elements, software, or the like. For example, the functionality of reader 106 and locator 107 may be implemented within a single hardware component and/or software module, or they may be broken out into separate functional components. Accordingly, the architecture shown in FIG. 1 is intended to illustrate the overall functionality of the invention according to one embodiment, and is not intended to limit the scope of the claimed invention to any particular set of components.

In one embodiment, MFP 100 can access other forms of media through electronic data input peripherals (not shown) including, for example, magnetic media readers for magnetic media such as floppy disks, magnetic tape, fixes hard disks, removable hard disks, memory cards, and the like. Peripherals may also include optical media readers (not shown) for optical storage media such as CDs, DVDs, magneto-optical disks, and the like. In addition, in one embodiment MFP 100 is communicatively coupled to storage device 109, which may be a hard drive or other device capable of storing collections of digital documents, for example in database form. Storage device 109 may be at the same location as MFP 100, or it may be remotely located, connected for example via a network.

As described above in connection with FIG. 3A, collection coversheet 101 includes machine-readable collection identifier 102 and collection overview area 501 containing thumbnail representations 503A-H of digital documents. Alternatively, collection coversheet 101 may have an embedded RFID tag containing collection identifier 102. Check boxes are included on coversheet 101 and may be marked to point to one of thumbnails 503A-H, thus identifying a particular document as the target for an action specified by marking one or more of the check boxes in action selection area.

MFP 100 receives 201 an image 105 of coversheet 101, for example by scanning coversheet 101 using scanner 104 according to techniques that are well known in the art. Alternatively, MFP 100 may use other input mechanisms known to persons of ordinary skill in the art to receive the image of coversheet 101 (processing block 201). For example, MFP 100 may receive the image via e-mail, fax, retrieval from previously stored coversheet 101 images, or the like.

MFP 100 then locates 202 collection identifier 102 within image 105 of coversheet 101, and reads the identifier 102

(processing block 203). In one embodiment, processing blocks 202 and 203 are performed by passing image 105 or the physical page in the case of RFID to code locator and reader 106, which locates and reads collection identifier 102. Collection identifier 102 identifies the storage location of documents in the collection. In one embodiment, identifier 102 is a URL or the like that identifies documents by location and filename. For example, identifier 102 may identify documents within storage device 109. In one embodiment, identifier 102 also identifies a map that associates documents with particular regions within collection overview 501.

Code locator and reader 106 passes the read collection identifier 102 to document identifier and processor 113 as described in more detail below.

MFP 100 locates 204 collection overview 501 within image 105 of coversheet 101, for example by determining the overall size and shape of overview 501. In one embodiment, overview 501 is provided at a standard location within coversheet 101, or is color-coded or otherwise marked, so as to facilitate easier identification of overview 501. Alternatively, overview 501 can be at an arbitrary location and have arbitrary characteristics. In one embodiment, marked check box locator 107b component of MFP 100 performs processing block 204; in another embodiment, another component (not shown) of MFP 100 performs this operation.

MFP 100 locates 205 check box(es) that have been marked on collection overview 501. In one embodiment, marked check box locator 107 component of MFP 100 performs processing block 205. Processing block 205 may be performed in response to the user specifying, via control interface 117, that one or more marked check boxes are present. Alternatively, locator 107 may be configured to automatically attempt to locate marked check boxes whenever a coversheet 101 has been scanned by scanner 104.

In one embodiment, marked check boxes are recognized by check box locator 107. Alternative methods for locating objects in an image are known in the art or have been described in related co-pending applications.

Based on which of the check boxes have been marked in the action indication area of coversheet 101, check box locator 107 identifies 206 the desired action(s). In one embodiment, action sticker locator and reader 107 passes the action request 112 to document identifier and processor 113.

MFP 101 also determines, based on which of the check boxes $503A_1$-$503H_3$ in overview 501 are marked, the desired target document(s) for the action. In one embodiment, check box locator 107 determines the location of each marked check box $503A_1$-$503H_3$, and document identifier and processor 113 determines a target document by comparing the location of marked check box with known information about thumbnail 503 locations in overview 501.

In one embodiment, storage device 109 includes a map 110 corresponding to each collection; the map provides coordinates for thumbnails 503 within overview 501. Thus, two-dimensional coordinates within overview 501 identify (or map to) documents, based on the locations of thumbnails 503 for those documents. In one embodiment, the map is implemented as a list of rectangles, one representing the entire collection overview 501, and other rectangles representing positions of document thumbnails 503 within the overview 501. Map 110 may be stored as a separate file, such as a Scalable Vector Graphics (SVG) file containing a description of collection overview 501 with identifiers that associate regions within the overview 501 with documents in the collection. Alternatively, map 110 may be stored as part of collection information 301.

Document identifier and processor 113 uses collection identifier 102 (obtained from code locator and reader 106) to retrieve, from storage 109, map 110 indicating the correspondence of coordinates within collection overview 501 to collection documents. Based on the map and based on marked check box location information 111, document identifier and processor 113 determines a target document. If a marked check box is within a rectangle representing a document thumbnail 503, the corresponding document is deemed to be the target of the action. Alternatively, in such a situation where ambiguity exists as to whether a document is the target document, MFP 101 can do any of the following: prompt the user, via control interface 117, to specify whether the document is intended to be the target.

In one embodiment, processing blocks 205 and 206 are performed using known techniques of optical feature recognition.

If more than one check box 103 is found marked in action indication, document identifier and processor 113 sorts the actions in an appropriate order (processing block 207). For example, if marked check boxes 103 in the action indication area indicate that one or more documents should be both printed and deleted, the print action should take place before the delete action. In one embodiment, the default sort order is as follows: print, e-mail, fax, group, ungroup, delete. Alternatively, MFP 100 may alert the user to the presence of multiple actions on a document and request clarification (via control interface 117, for example) as to the intended order to carry out the actions.

If a specified action involves transmitting the document, for example, by e-mail or fax, MFP 100 locates the correct routing information (such as an e-mail address or a fax number) indicating the desired destination for the document. Routing information can be included on or written in the action indication area 515, or some other predetermined area on coversheet 101, such as written in annotation area 502 of coversheet 101, so that it can be extracted via optical character recognition (OCR). For example, if a single e-mail address is written in action indication area 515 or on the line next to the e-mail action, all documents to be e-mailed can be sent to that e-mail address. Alternatively, MFP 100 can prompt the user to enter routing information via control interface 117. Alternatively, the routing information could be written on a second sheet of paper to be scanned or in a second image received by MFP 100. In any of these embodiments, the operation of determining routing information can be performed by marked check box locator 107, or by document identifier and processor 113, or by another component of MFP 100.

Once actions and target document(s) have been determined, document identifier and processor 113 uses collection identifier 102 (obtained from code locator and reader 106) to retrieve, from storage 109 (processing block 208), the target document(s) 114 and performs the specified action(s) in the determined order (processing block 209). For some actions (such as delete), retrieval of the document(s) 114 is not required, and processing block 208 is not performed. In one embodiment, document identifier and processor 113 first retrieves collection information 301 which includes or points to target document(s) 114, and then obtains target document(s) 114 accordingly.

Some examples of check boxes and their corresponding actions include:

Print check box: Document identifier and processor 113 sends target document(s) 114 to printer 115. Printer 115 outputs printed document 116.

E-mail or fax check box: Document identifier and processor 113 sends the documents to an e-mail or fax module (not shown) of MFP 100 to be transmitted accordingly.

Group check box: Document identifier and processor 113 creates a new sub-collection including the target documents, deletes the target documents from the original collections, and adds the new sub-collection to the original collection. In one embodiment, all of the documents identified with marked check boxes are placed into the same new sub-collection.

Ungroup check box (on an existing sub-collection): Documents within the sub-collection are retrieved and placed in the overall collection corresponding to coversheet 101.

Delete check box: Document identifier and processor 113 deletes the specified document(s) or sub-collection(s). In one embodiment, a confirmation dialog box is presented on control interface 117 before the delete operation is performed.

Play check box: Document identifier and processor 113 sends target document(s) 114 (such as audio and/or video files) to an output device to be played, such as audio I/O device 120.

Document identifier and processor 113 determines 210 whether any of the performed actions cause changes to collection map 110 and overview 501. If so, document identifier and processor 113 modifies 211 collection map 110 and overview 501 accordingly to indicate locations of thumbnails 503A-H corresponding to new documents and sub-collections and to delete one or more thumbnails 503A-H for documents and sub-collections that have been removed. The updated collection info 301, map 110, and/or overview 501 are stored in storage device 109. Optionally, the updated collection information 301 and map 110 are sent to coversheet generator 302 for generation of an updated coversheet 101A including a new overview 501, as described below.

When documents are moved from one collection to another, a default layout can be used for the arrangement of thumbnails 503A-H. Alternatively, the user may be given an opportunity to indicate a layout. Such techniques are described in related cross-referenced patent applications.

Printer 115 may optionally (or automatically) print 212 a new collection coversheet 306 representing the collection, particularly if collection organization has been modified, or if check boxes have been marked.

For example, printing of a document in the collection can be requested by marking a print check box on a coversheet 101. Machine-readable code locator and reader 106 reads the collection identifier 102. Check box locator 107 locates and reads the marked print check box, passing marked check box location information 111 and a print action request 112 to document identifier and processor 113. Document identifier and processor 113 identifies the target document based on the marked check box location information 111 and on map 110 retrieved from storage 109. Document identifier and processor 113 retrieves document 114 from storage and passes it to printer 115. Printer 115 outputs printed document 116.

In one embodiment, when collection organization is modified (such as by changing hierarchy, layout, or access levels), a new version of the collection is created. Thus, rather than overwriting the collection with new information, an updated version of the collection is generated and stored in a new location within storage 109, and a new collection identifier 102 is generated that points to the new location. A new coversheet 101A is printed with the new collection identifier 102. In this manner, previous versions of collections are preserved.

For example, when a document is deleted, a new collection is created which is exactly like the original collection except that it omits the deleted document. Map 110 and overview 501 are altered to reflect that the document has been deleted. The new collection can be a new version of the original collection. Such versioning techniques are described in detail in related cross-referenced applications.

In one embodiment, MFP 100 includes coversheet generator 302, either as a separate functional module or as a component of document identifier and processor 113 or some other component. Coversheet generator 302 is therefore an optional component that need not be included, and indeed is absent in some embodiments. When included, coversheet generator 302 performs processing block 211 to receive updated collection info 301A from document identifier and processor 113, modify collection map 110, and generate an updated coversheet 101A to be sent to printer 115 to be output as printed coversheet 306.

Coversheets

A collection coversheet is a paper that represents a collection and, in one embodiment, comprises a header, a string of text printed in a machine-readable format, a collection overview image, optionally, an area in which notes may be written, and optionally a human-readable version of the text encoded in the machine-readable code.

The header contains printed information about the collection. This information may include the author of the collection, a list of zero, one or more people who will be notified if the collection is modified, time and date information about when the collection was last modified or when this coversheet was printed out, and an optional collection topic or subject.

In one embodiment, the machine-readable code contains an encoded version of a unique pointer to the collection on the collection server. In one embodiment, this same pointer when presented in the human-readable form is similar to a uniform resource locator or URL used in the World Wide Web and is referred to herein as a collection identifier, distributed resource identifier, or DRI. In one embodiment, a collection server uses these DRIs as unique collection pointers. In one embodiment, DRIs are globally unique, difficult to guess, and can provide access to collections from anywhere on the Internet.

Within this specification, the terms "collection identifier," "distributed resource identifier," and "DRI" will be used interchangeably and should be understood to mean the same thing—a unique identifier that points to a collection of media and documents stored on a collection server. Also, the identifier might be written in human-readable form or machine-readable form. Both printed forms represent the same identifier and point to the same collection even though they look unlike each other.

In one embodiment, the DRI used for a collection points to a directory that contains the collection of documents as well as information used to build the collection overview and some additional metadata. DRIs can also point directly to an individual file the same way that a URL can point to either a directory or a file.

Since a collection typically comprises a multitude of documents, the DRI is often a directory reference rather than a reference to a particular file. For example, in an OS (operating system) such as Unix, the DRI can be a directory reference such as /usr/collection. Alternatively, the DRI can refer to a file that in turn leads to an identification of the constituent elements of a collection. In still another alternative, the DRI can be a reference to a database that stores the collection.

The text of the DRI 510 may comprise a string of characters that includes a random text component. This randomly (and thus, unguessable) generated text serves to prevent access to a collection because it is virtually impossible to guess.

The example DRI "/root/usr/collection" assumes a single-machine architecture. In a more generalized configuration of two or more machines, the DRI can include a machine name component. For example, a more accessible format such as the URL (universal resource locator) format for identifying World Wide Web (WWW) pages might be suitable. In one embodiment, the DRI constitutes the path portion of the URL. Purely by convention, the path portion uses the following naming format according to a particular embodiment of this aspect of the present invention:

.../-DDS-/ORIGIN/ ..., where DDS is the name of a particular repository of collections, and ORIGIN is the fully qualified hostname of the original server for the collection identified by the DRI.

Thus, for example, a collection may be identified by the following URL:

http://machine1.com/-msg-/machine2.com/2002/1022/298hy9y8h8#$30er#/1/

The IP address of the machine is identified by "machine1.com." The path portion refers to a collection stored in a repository named "-msg-." The original copy of the collection (i.e., its place of creation) is located on a machine named "machine2.com." Thus, in this case, "machine1" contains a copy of the collection. In one embodiment, collections are contained in directories, though other data storage conventions can be used; e.g., collections can be stored and managed in a database. The collection shown in the example above is stored in a directory called:

"/2002/1022/298hy9y8h8#$30er#/1/."

The pathname portion "/2002/1022" represents a date; e.g., date of creation of the collection. The string "398hy9y8h8#$30er#" represents randomly generated text. Finally, as will be discussed below, the directory represented by the terminal pathname "/1/" refers to the first (initial, original, base, etc.) version of the collection.

In one embodiment, both the host machine ("machine1") and the original machine ("machine2") use the following directory structure and URL naming structure. The host machine has a directory called "-msg-" contained in its respective "root" directory for storing collections. The "-msg-" directory has a sub-directory called "machine2.com" which contains all the collections originating on "machine2.com." Generally, a sub-directory is provided for each machine that can be an originator of a collection.

Given the DRI, a person or machine will have enough information to access the collection in order to add to or modify the collection.

Using a 2-D bar code representation of a DRI allows for automated access to the collection without requiring the user to manually enter the location. It can be appreciated of course that any machine-readable indicium can be used instead of a bar code system, including optical character recognition (OCR) of the human-readable DRI.

Using the MFP and/or the processing logic and the techniques described herein, it is possible to create and modify collections on a collection server. A new, empty collection can be created. A new non-empty collection can be created using available documents and media. Electronic media and paper documents can be added to existing collections. A collection can be printed. Collections can be added to or merged. Also, actions can be taken on individual media in a collection using notes or actions selected on the coversheet.

In one embodiment, scalable vector graphics files or SVG files are used to represent the collection overview. SVG files are a standard way of creating a visual representation on the World Wide Web and there are many viewers and tools for creating SVG. A collection preferably includes a specially name SVG file which can be used to construct an overview image for the coversheet or any display. In one embodiment, the SVG file includes information for displaying the thumbnails of individual documents and media stored in the collection.

Metadata about the individual files in the collection and their relationship to other files in the collection is stored preferably in an XML (extensible markup language) file. In one embodiment, this information includes image width and height, links between images and their thumbnails and links between a document and an image representing that document. The exact format is unimportant as long as the collection server understands how to read and write the format.

Additional information related to the collection as a whole can also be stored in the metadata file. This information might include the time at which the message was created, the subject of the message, the name of the author of the collection, and contact information such as email addresses, fax numbers, etc. belonging to those who should be notified when a collection is altered.

While creating a new collection, either a printout is generated or the information about the new collection, including at least the DRI is emailed or faxed to someone. Otherwise, the DRI will be lost to all but the collection server and will not be available for adding documents because no one will have or be able to guess the DRI.

The MFP contacts the collection server through a network to request a new collection identifier or DRI. It should be understood that it is possible for the MFP to request identifiers in advance so that if the collection server is busy or temporarily offline, the MFP can still create new collections.

If the coversheet is to be printed, then the MFP composes a coversheet. In one embodiment, a header block is created including at least the date and time of the creation of the new collection. The DRI or identifier obtained from the collection server is added to the coversheet at the bottom in human-readable form and then encoded in an industry standard two-dimensional PDF417 type barcode in one embodiment and added to the upper right-hand corner of the coversheet. An SVG representing the overview is converted to image form and added to the appropriate place in the coversheet. Additional information might also be added as deemed appropriate. The composition of the coversheet described here is one possibility but anyone skilled in the art will recognize that there are many ways to lay out or compose a coversheet that are within the scope of this invention.

The task of adding to an existing collection requires a collection to exist. To add to that collection at the MFP, the user uses a coversheet from the existing collection. As mentioned, each collection identifier represents a single collection but collections can change over time. In one embodiment, each time a collection changes, the last path element in the DRI is modified. Those who have access to a single collection are thereby easily given access to all versions of that collection. In one embodiment, the version name or final pathname of /0/ has a special significance and means the "latest" or "most recently created" version.

In one embodiment, pathname /1/ indicates the first version of the collection, /2/ represents the second version, etc. When a new collection is uploaded to the collection server, a new directory using the next integer is created. The next collection after /2/ would preferably be called /3/. In order to maintain unique version numbers, it is essential that only one device, i.e., the collection server, create the version number of final pathname. The version number cannot be created by the MFP because multiple MFPs might generate a number at the same time and choose the same name. Instead, the MFPs create a collection and upload it to a temporary directory on the collection server and when everything is uploaded, the collection server moves it into place and assigns the final pathname.

If the user has additional paper documents, they can be placed on an automatic document feeder. If the user has images or other documents in a memory card or some other media, the media can be placed in the appropriate reader.

If the user wishes to create some electronic media at the time of the creation of the new collection, the user records audio, video, still images, or other electronic media using any of the microphone, a digital camera, video camera, or other media-capturing device may be used.

Each DRI is associated with the page of the document or image in which it was found. However, the MFP can recognize that a page containing a DRI represents a collection. Putting a page with a DRI into any collection, new or existing, could be understood as a request to add that collection to the new collection. In other words, the page containing the DRI represents a request to add the collection pointed to by that DRI to the new collection. The overview image of that collection will be retrieved and added as a thumbnail to the new collection and the subject of that collection will be used as the title for the thumbnail.

Because this is a new collection, one or more new identification numbers are requested and received from the collection server. In one embodiment, only a single collection identifier is needed for a new collection.

Each document or page that was found to contain a DRI in machine-readable form is replaced with an image representing the collection pointed to by that DRI.

A thumbnail is created for each page or document or other media. The thumbnail is preferably a smaller version of the page that is similar in appearance but smaller in storage size and in number of pixels. With recorded audio, a thumbnail is just a representation of the audio and could be a waveform or even a standard computer icon representing the audio. In the preferred embodiment, the audio could be displayed as a rectangle containing a waveform whose shape is based on the audio content and whose length corresponds to the duration of the audio recording. A video thumbnail could be a single frame or a small number of representative frames from the video composited into a single small image. Those who are skilled in the art will understand that there are many various ways of creating thumbnails to represent media. Each collection coversheet was replaced with a collection overview image that is now reduced to form a thumbnail.

All of the media and documents for the new collection are now added to the collection, which means that they are uploaded to the collection server and placed in the directory pointed to by the DRI of the new collection. There are many well-known protocols for uploading files to a server, including FTP, SCP, HTTP PUT. Preferably, the HTTP PUT protocol is used which allows the MFP to specify the location and contents of each media file as it is being uploaded.

The thumbnails representing the new media items are arranged in the collection overview. The thumbnails are placed in an appropriate manner within the overview, expanding the overview size if necessary.

The SVG file representing the overview is written and uploaded to the collection server and all of the thumbnails are uploaded.

One method for placing thumbnails is to find a place in the overview image where the thumbnail can be positioned where it will not overlap any other thumbnail. An exhaustive search—moving the thumbnail to different positions within the overview and looking for overlaps with other thumbnails—is too slow. Another approach is to reduce the problem to that of placing a single point. This can be done by reducing the size of the overview by the width and height of the thumbnail to be placed and enlarging the existing thumbnails by the same dimensions. The origin of the new thumbnail can be placed anywhere within the remaining space in the overview without overlapping existing thumbnails. This is known as a "configuration space" approach because instead of finding a new thumbnail location in the original two dimensional space of the overview, a new "available-space" region is calculated in which the origin of the thumbnail is placed instead of the entire thumbnail. Configuration space techniques for interference checking are well known in the field of robotics and path planning.

The size of the thumbnail to be added to the overview is determined. Thumbnail sizes are usually measured in pixels. Often thumbnails are chosen to be some standard size—chosen so that they neither the width nor height is larger than a certain maximum size—perhaps 150 pixels for standard display resolutions or two inches for printed thumbnails. Since some images might have a very large or very small aspect ratio. It might be more appropriate to limit the thumbnail to a maximum area—square pixels or square inches—rather than a maximum width and height.

Scaling an image so that it contains no more than some total number of pixels instead of restricting the width and height to be less than some maximum improves the overall appearance of the thumbnails and is the preferred method of selecting a thumbnail size. However, any method for choosing thumbnail sizes can be used for the present invention.

In one embodiment, a single bounding box for all the thumbnails previously placed on the overview is calculated and the origin of the new thumbnail is placed outside of that bounding box. It is also possible and understood by extension that instead of calculating just a single bounding box, an individual bounding box for each thumbnail may be calculated and extended so that the new thumbnail can be placed in any available position in the overview. This is well understood by those experienced with path planning algorithms and would be analogous to allowing a machine to travel between obstacles instead of requiring the robot to go around all the obstacles.

Adding a second new thumbnail now to the overview could be accomplished. However, instead of adding one bounding box to cover all the thumbnails, simply adding a single box representative of the newly added thumbnail is the preferred approach. This box is calculated to be the size of the newly added thumbnail and then is extended up and to the left by the width and height of the thumbnail to be added, just like the first bounding box.

All new thumbnails are uploaded to the collection server as well as the new overview description file and metadata file.

Modifying the overview could be accomplished using an object-based drawing tool like those available in Microsoft's PowerPoint software or Adobe Illustrator or similar tools. These tools and techniques are well understood by those skilled in the art.

All modified information is sent to the collection server, including the metadata files, SVG overview file, and any changes in the collection.

The user may bring media to the MFP or creates it using media recording devices or the like connected to the MFP or to the network.

The advantage of having a machine-readable collection identifier on a coversheet is that the MFP or any device that can locate and decode machine-readable codes can determine which collection is represented by the coversheet. The user can indicate which collection the new media will be added to by typing in a collection identifier or DRI but this can be a difficult task because DRIs tend to be long random strings of characters. DRI's can be located and decoded from a scanned image or read using handheld barcode scanners if they are encoded in barcode format. Handheld scanners which read many different types of one and two-dimensional barcodes are available from many companies like Hewlett-Packard Company of Palo Alto, Calif., USA. They can also be read in text form using optical character recognition technology or decoded from a magnetic strip if properly encoded. If a coversheet of the collection is available, the coversheet should be placed on the MFP where it can be scanned, either in the automatic document feeder or directly on the glass platen. Alternatively, the barcode can be scanned using a handheld scanner. If the barcode has been captured in a digital image, perhaps using a digital camera, the camera can be directly connected to the MFP or a memory card from the camera can be plugged into a card reader. There are many other methods for presenting the MFP with a machine-readable DRI and those methods and techniques are not enumerated herein because they are understood by those skilled in the art.

In one embodiment, a machine-readable DRI is presented as part of the coversheet of the collection. In one embodiment, the DRI is contained in PDF417 format two-dimensional barcode on the coversheet and the coversheet is placed on an automatic document feeder (ADF) of the MFP. Additional documents or pages to be added to the collection are placed behind the coversheet. The additional pages can be any document pages or they can be coversheets of other messages.

Each of the documents and media is searched for a machine-readable DRI. When a bar-coded DRI is scanned using a handheld scanner, the DRI can be stored in the memory of the MFP so that it can be accessed when it is time to determine which collection to add the new media to. If the ADF or a platen has been used to scan in a coversheet or if the DRI is contained in an image from the digital camera, the DRI will have to be read from the scanned r captured image. Either source of a DRI is acceptable and typically, if there is no DRI held in a memory due to hand scanning of a coversheet, the first scanned sheet or first image will contain the DRI. Those skilled in the art will recognize that there are many ways of providing the DRI to the MFP an exhaustive list need not be provided.

The entire image media including images that are scans of document pages is searched for machine-readable codes. Typically, when adding a page or document to a collection, the image of that page is added to the collection storage area and a thumbnail is added to the overview. If that page happens to contain a machine-readable DRI then based on the users preference, instead of adding the page to the collection, the collection that the DRI represents can be added to the collection. For each page or image containing a DRI, the "page add" request is converted into a "collection add" request with the appropriate DRI representing the collection.

Thumbnails are created for all of the new images, documents, pages, and media. For those pages that represent other collections, thumbnails are made for the collections instead of the page. All collected media is uploaded to the collection server.

It is important that the existing collection be changed in a way that makes the current state or version of the collection available at a later time. The new media should not be placed in the same storage area as the existing collection.

Typically, new media and thumbnails in a collection are uploaded to a staging area on the collection server. The staging area is associated with the collection identifier but doesn't have a permanent final pathname. As soon as all of the information has been uploaded and is complete, the collection server moves the collection into a final directory or storage area with a permanent final pathname. The permanent final pathname is usually the next integer after the most recently uploaded collection.

The thumbnails representing the new media are added to the collection overview.

The thumbnails, metadata, and the overview SVG file, are uploaded to the staging area in the collection server. All changes and modifications are finally uploaded to the collection server and at this point, the server has everything required to move the collection out of the staging area and into the final directory upon assigning a version number.

A collection server can keep a mapping of collection identifiers to collection directories.

A system for processing a stored document comprises
a document index input device, to receive an image of a document index;
a marked check box locator, coupled to the document input index device, to identify at least one action set forth in the image and to identify a location on the document index image of at least one indication area having a mark therein, the at least one indication area being associated with at least one document;
a document identifier, coupled to the marked check box locator, to identify the at least one document based on the location of the at least one indication area having the mark therein; and
a document processor, coupled to the document identifier, to perform the at least one action on the at least one document.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims that in themselves recite only those features regarded as essential to the invention.

What is claimed is:

1. A computer-implemented method comprising:
scanning a coversheet having an overview of a collection;
receiving an image of the overview of the collection that comprises a first plurality of indication areas associated with a plurality of documents and a second plurality of indication areas associated with a plurality of actions, wherein the plurality of actions includes printing, faxing, sending by electronic mail, and grouping;
identifying at least one action from the plurality of actions set forth in the image;
identifying at least one document from the plurality of documents for the at least one action identified from the plurality of actions, wherein the identifying the at least one action from the plurality of actions set forth in the image is performed based on the second plurality of the indication areas in the image, the identifying the at least one document from the plurality of documents is performed based on the first plurality of the indication areas in the image, wherein the at least one action from the plurality of actions and the at least one document from the plurality of documents are identified by scanning the image; and
performing the at least one action on the at least one document in response to the identifying the at least one action from the fourth plurality of actions set forth in the image and the identifying the at least one document from the third plurality of documents from the image.

2. The method defined in claim 1 wherein identifying the at least one document comprises:
  identifying a location on the image of at least one indication area having a mark therein, the at least one indication area being associated with the at least one document; and
  identifying the at least one document based on the location of the at least one indication area having the mark therein.

3. The method defined in claim 2 wherein the at least one indication area comprises one of a plurality of check boxes in the image, wherein each of the plurality of check boxes is associated with one of a plurality of graphics in the image, wherein each of the plurality of graphics is associated with one or more documents.

4. The method of claim 2, wherein the collection overview comprises a plurality of representations of documents, and wherein identifying at least one document based on the location of the at least one indication area comprises identifying the at least one document corresponding to a document representation indicated by the mark in the at least one indication area.

5. The method of claim 2, wherein the collection overview comprises a plurality of representations of documents; and further
  wherein identifying the at least one document based on the location of the at least one indication area having the mark therein comprises:
  determining a coordinate location for the at least one indication area having the mark therein;
  determining a coordinate location for at least one of the document representations; and
  identifying a first document by comparing the coordinate location for at least one indication area having the mark therein with the coordinate location for the at least one document representation.

6. The method defined in claim 2 wherein each of the at least one indication area comprises a check box.

7. The method defined in claim 2 wherein the indication area is located on top of a portion of a graphic representing at least one document in a collection.

8. The method defined in claim 1 wherein the image includes a machine readable pointer to identify the collection.

9. The method defined in claim 8 wherein the machine readable pointer comprises a 2-D barcode.

10. The method of claim 8, wherein the machine readable identifier comprises an identifier specifying a storage location, and the method further comprising, prior to performing the at least one action, retrieving the at least one document from the storage location.

11. The method defined in claim 1 wherein receiving an image of an overview of the collection comprises capturing an image of the sheet and identifying at least one document by reading an RFID tag embedded in the sheet, the data on the RFID tag identifying the collection containing a document.

12. The method defined in claim 1 further comprising scanning a sheet having an identifier and having graphical content representing a collection of one or more media objects, wherein scanning the sheet results in creating the image.

13. The method defined in claim 1 wherein the plurality of actions comprise two or more of a group consisting of printing, faxing, sending by electronic mail, deleting, grouping, ungrouping, and playing.

14. The method defined in claim 1 wherein identifying at least one action set forth in the image comprises identifying a location of a mark in an action indication area on the image.

15. The method defined in claim 1 wherein the at least one documents comprises a collection of documents.

16. The method defined in claim 1 wherein the at least one document is part of a stored collection, and further wherein the collection overview comprises a collection coversheet.

17. The method of claim 16, wherein the collection overview comprises a plurality of thumbnail depictions of documents.

18. The method of claim 16, wherein the collection coversheet comprises a machine-readable collection identifier specifying a storage location for the collection, the method further comprising, prior to performing at least one action, retrieving the at least one document from the storage location.

19. The method of claim 1, wherein the collection overview comprises a list of documents.

20. The method of claim 1, wherein the collection overview comprises a plurality of thumbnail depictions of documents.

21. The method of claim 1, wherein the collection overview comprises a plurality of icons representing documents.

22. The method of claim 1, wherein the at least one action specifies a grouping action, and wherein the at least one document comprises two or more documents, and wherein performing the at least one action comprises grouping the two or more documents.

23. The method of claim 21, wherein grouping the two or more documents comprises forming a sub-collection comprising the two or more documents.

24. The method of claim 1, wherein the at least one action comprises transmitting the at least one document to a destination, the method further comprising determining a destination.

25. The method of claim 24, wherein determining a destination comprises receiving user input specifying a destination.

26. The method of claim 24, wherein determining a destination comprises reading an indicator of a destination from the image.

27. The method of claim 26, wherein determining a destination comprises reading an indicator of a destination from an action indication area in the image.

28. The method of claim 27, wherein determining a destination comprises determining at least one selected from the group consisting of an e-mail address; a fax number; a uniform resource locator; a telephone number; and a mailing address.

29. The method of claim 1, wherein receiving the image of a document index comprises receiving an e-mail message containing the image of the document index.

30. The method of claim 1, wherein receiving the image of a document index comprises receiving a fax message containing the image of the document index.

31. The method of claim 1, further comprising determining the at least one action by performing optical character recognition on an action indication area.

32. The method of claim 1, further comprising, prior to performing the at least one action, retrieving the at least one document from a storage device.

33. A computer-implemented method comprising:
  scanning a coversheet having a document index to provide a document index image;
  receiving the document index image that includes an overview of a collection of document that comprises a first plurality of check boxes associated with a plurality of documents, a machine readable pointer identifying the collection, and an action indication area that includes a second plurality of check boxes associated with a plurality of action, wherein the plurality of actions includes printing, faxing, sending by electronic mail, and grouping;

locating, on the document index image, at least two marked check boxes, wherein a first marked check box out of the first plurality of check boxes is associated with a document out of the plurality of document and a second check box out of the second plurality of check boxes is associated with an action out of the plurality of actions;

identifying the action from the plurality of actions from the document index image for the second marked check box;

identifying the document from the plurality of document for the first marked check box based on location of the first marked check box on the document index image, wherein the document is identified for the action identified from the plurality of actions from the document index image, wherein the action and the document are identified by scanning the coversheet having the document index; and performing the action on the documents in response to the identifying the action and the document, wherein each of the action and the document is identified for each of the marked check boxes on the document index image.

34. A computer readable storage medium having instructions stored thereon which, when executed by a computer, cause the computer to perform operations comprising:

scanning a coversheet having an overview of a collection;

receiving an image of the overview of the collection that comprises a first plurality of indication areas associated with a plurality of documents and a second plurality of indication areas associated with a plurality of actions, wherein the plurality of actions includes printing, faxing, sending by electronic mail, and grouping;

identifying at least one action from the plurality of actions set forth in the image;

identifying at least one document from the plurality of document for the at least one action identified from the plurality of actions, wherein the identifying the at least one action is performed based on the second plurality of the indication areas in the image and the identifying the at least one document is performed based on the first plurality of the indication areas in the image, wherein the at least one action and the at least one document are identified by scanning the image; and performing the at least one action on the at least one document in response to the identifying the at least one action from the fourth plurality of actions set forth in the image and the identifying the at least one document from the third plurality of document from the image.

35. The computer readable storage medium defined in claim 34 wherein identifying the at least one document comprises identifying a location on the document index image of at least one indication area having a mark therein, the at least one indication area being associated with the at least one document; and identifying the at least one document based on the location of the at least one indication area having the mark therein.

36. The computer readable storage medium defined in claim 35 wherein the at least one indication area comprises one of a plurality of check boxes in the image, wherein each of the plurality of check boxes is associated with one of a plurality of graphics in the image, wherein each of the plurality of graphics is associated with one or more documents.

37. The computer readable storage medium defined in claim 34 wherein each of the at least one indication area comprises a check box.

38. The computer readable storage medium defined in claim 34 wherein the indication area is located on top of a portion of a graphic representing at least one document in a collection.

39. The computer readable storage medium defined in claim 34 where identifying at least one document comprises obtaining information about a collection containing the at least one document using an RFID tag.

40. The computer readable storage medium defined in claim 34 wherein the method further comprises scanning a sheet having an identifier and having graphical content representing a collection of one or more media objects, wherein scanning the sheet results in creating the image.

41. The computer readable storage medium defined in claim 34 wherein the plurality of actions comprise two or more of a group consisting of printing, faxing, sending by electronic mail, deleting, grouping, ungrouping, and playing.

42. The computer readable storage medium defined in claim 34 wherein identifying at least one action set forth in the image comprises identifying a location of a mark in an action indication area on the image.

43. The computer readable storage medium defined in claim 34 wherein the at least one documents comprises a collection of documents.

44. The computer readable storage medium defined in claim 34 wherein the at least one document is part of a stored collection, and further wherein collection overview comprises a collection coversheet.

45. The computer readable storage medium defined in claim 44 wherein the collection coversheet comprises a collection overview.

46. The computer readable storage medium of claim 45, wherein the collection overview comprises a plurality of thumbnail depictions of documents.

47. The computer readable storage medium of claim 44, wherein the collection coversheet comprises a machine-readable collection identifier specifying a storage location for the collection, the method further comprising, prior to performing at least one action, retrieving the at least one document from the storage location.

48. The computer readable storage medium of claim 34, wherein the collection overview comprises a list of documents.

49. The computer readable storage medium of claim 34, wherein the collection overview comprises a plurality of thumbnail depictions of documents.

50. The computer readable storage medium of claim 34, wherein the collection overview comprises a plurality of icons representing documents.

51. The computer readable storage medium of claim 34, wherein the at least one action comprises transmitting the at least one document to a destination, the method further comprising determining a destination.

52. The computer readable storage medium of claim 51 wherein determining a destination comprises receiving user input specifying a destination.

53. The computer readable storage medium of claim 51, wherein determining a destination comprises reading an indicator of a destination from the image of the document index.

54. The computer readable storage medium of claim 53, wherein determining a destination comprises reading an indicator of a destination from an action indication area in the image of the document index.

55. The computer readable storage medium of claim 54, wherein determining a destination comprises determining at least one selected from the group consisting of an e-mail address; a fax number; a uniform resource locator; a telephone number; and a mailing address.

56. The computer readable storage medium of claim 34, wherein receiving an image of a collection overview comprises receiving an e-mail message comprising the image of the collection overview.

57. The computer readable storage medium of claim 34, wherein receiving an image of a collection overview comprises receiving a fax message comprising the image of the collection overview.

58. The computer readable storage medium of claim 34, further comprising determining the at least one action by performing optical character recognition on an action indication area.

59. The computer readable storage medium of claim 34, wherein the document index comprises an identifier specifying a storage location, and the method further comprising, prior to performing the at least one action, retrieving the at least one document from the storage location.

60. The computer readable storage medium of claim 34, further comprising, prior to performing the at least one action, retrieving the at least one document from a storage device.

61. A computer system for processing a stored document, comprising:
 a document index input device including a scanner to scan a coversheet having a document index to provide an image of the document index;
 a marked check box locator, coupled to the document input index device, to identify at least one action from a plurality of actions set forth in the image by identifying a location of a ark in an action indication area on the image, wherein the plurality of actions includes printing, faxing, sending by electronic mail, and grouping, wherein the action indication area is associated with the plurality of actions, to identify a location on the document index image of at least one indication area having a mark therein, the at least one indication area being associated with at least one document out of a plurality of document set forth in the image;
 a document identifier, coupled to the marked check box locator, to identify the at least one document from the plurality of document set forth in the image based on the location of the at least one indication area having the mark therein, wherein the at least one action and the at least one document are identified by scanning the coversheet; and
 a document processor, coupled to the document identifier, to perform the at least one action identified from the plurality of action presented on the document index on the at least one document identified from the plurality of documents presented on the document index.

62. The computer system of claim 61 wherein each of the at least one indication area comprises a check box.

63. The computer system of claim 61 wherein the indication area is located on top of a portion of a graphic representing at least one document in a collection.

64. The computer system of claim 61 further comprising a scanner to scan a sheet having an identifier and having graphical content representing a collection of one or more media objects, wherein the scanner outputs the image.

65. The computer system defined in claim 61 wherein the at least one documents comprises a collection of documents.

66. The computer system defined in claim 61 wherein the at least one indication area comprises one of a plurality of check boxes in the image, wherein each of the plurality of check boxes is associated with one of a plurality of graphics in the image, wherein each of the plurality of graphics is associated with one or more documents.

67. The computer system defined in claim 61 wherein the at least one document is part of a stored collection, and further wherein the index comprises a collection coversheet.

68. The computer system defined in claim 67 wherein the collection coversheet comprises a collection overview.

69. The computer system of claim 68, wherein the collection overview comprises a plurality of thumbnail depictions of documents.

70. The computer system of claim 67, wherein the collection coversheet comprises a machine-readable collection identifier specifying a storage location for the collection, the method further comprising, prior to performing at least one action, retrieving the at least one document from the storage location.

71. The computer system of claim 61, wherein the document index comprises a plurality of representations of documents, and wherein the document locator identifies at least one document based on the location of the at least one indication area by identifying the at least one document corresponding to a document representation indicated by the mark in the at least one indication area overlapping a portion of at least one document image representation.

72. The computer system of claim 61, wherein the document index comprises a list of documents.

73. The computer system of claim 61, wherein the document index comprises a plurality of thumbnail depictions of documents.

74. The computer system of claim 61, wherein the document index comprises a plurality of icons representing documents.

75. The computer system of claim 61, wherein the at least one action comprises transmitting the at least one document to a destination, the method further comprising determining a destination.

76. The computer system of claim 61, wherein receiving an image of a document index comprises receiving an e-mail message comprising the image of the document index.

* * * * *